United States Patent

Fischer et al.

[11] Patent Number: 5,983,725
[45] Date of Patent: Nov. 16, 1999

[54] TACTILE PRESSURE SENSOR

[75] Inventors: Harald Fischer, Karlsruhe; Rainer Wolf, Grosswalbur, both of Germany

[73] Assignee: Forschungszenlrum Karlsruhe GmbH, Karlsruhe, Germany

[21] Appl. No.: 09/152,761

[22] Filed: Sep. 14, 1998

Related U.S. Application Data

[63] Continuation-in-part of application No. PCT/EP97/01397, Mar. 20, 1997.

[30] Foreign Application Priority Data

Apr. 27, 1996 [DE] Germany ............ 196 16 952

[51] Int. Cl.$^6$ ........................................... G01L 9/00
[52] U.S. Cl. ................................ 73/705; 250/231.19
[58] Field of Search ............... 73/705, 714, 862.041, 73/862.042, 862.043, 800, 700; 250/231.19, 227.21, 227.23

[56] References Cited

U.S. PATENT DOCUMENTS

| | | |
|---|---|---|
| 4,451,730 | 5/1984 | Brogardh et al. ............. 250/227.23 |
| 4,599,908 | 7/1986 | Thomas et al. . |
| 4,604,637 | 8/1986 | Ruhle et al. ............. 73/705 |
| 5,146,083 | 9/1992 | Zuckerman et al. ............. 250/227.21 |
| 5,341,676 | 8/1994 | Gouterman et al. ............. 73/700 |

FOREIGN PATENT DOCUMENTS 7-328128  3/1996  Japan .

*Primary Examiner*—William Oen
*Attorney, Agent, or Firm*—Klaus J. Bach

[57] ABSTRACT

In a tactile opto-electronic pressure sensor having a body with a rigid matrix including axially extending bores in which hollow cylinders of an elastic material are firmly disposed such that the front ends of the hollow cylinder project from one side of the matrix while the opposite ends of the hollow cylinders are flush with the other side of the matrix, a light emitting electro-luminescent foil is disposed on the front faces of the hollow cylinders such that light emitted therefrom shines through the hollow cylinders and is recorded by an evaluation device arranged at the other side of said matrix, the hollow cylinders being axially compressible such that their openings become smaller with increasing forces acting thereon, the light intensity received by the evaluation units depending on the forces applied to the hollow cylinders.

6 Claims, 2 Drawing Sheets

TACTILE PRESSURE SENSOR

This is a continuation-in-part application of pending international application PCT/EP97/01397 filed Mar. 20, 1997 and claiming the priority of German application 196 16 952.6 filed Apr. 27, 1996.

BACKGROUND OF THE INVENTION

The invention relates to a tactile pressure sensor including a body with axially extending bores whose diameters depend on the axial pressure to which the body is subjected so that the axial pressure can be determined by the intensity level of light passing through the bores.

Such a sensor includes a body having opposite end faces and being provided with axial bores through which light is directed from one of the end faces and the light intensity passing through the various bores is recorded and/or passed on at the opposite side. By an axial pressure on the body including the bores, or on the opposite body end faces, the open cross-section of the bores is narrowed so that the light intensity recorded at the exit end of the bores depends on the pressure to which the structure surrounding the bore is subjected. The light intensity measured at the bore exit therefore indicates the pressure load on the body.

DE 195 27 957 discloses a tactile opto-electronic pressure sensor. The tactile part of the sensor consists of an opaque rubber-like body provided with axial collimator bores through which light is directed by an electro-luminescent foil disposed at one end face of the rubber-like body. Under axial pressure load, the width of the axial bores changes. The light passing through the various bores is conducted from the exit end of the bores or its intensity is directly measured by opto-electronic means so that the pressure on the body can be represented topographically by a dot raster.

The disadvantage of such a tactile sensor structure is that the open width of the bores is not only affected by the pressure, but that there are also transverse deformations of the bores caused by the axial pressure: From the location of the maximum axial surface pressure, the rubber-like material is pressed radially outwardly so that the surrounding bores are being curved outwardly from the area where the highest pressure is effective. The curvature of these bores reduces straight light transmission through the bores so that the force results obtained from measuring the light passing through those curved bores are falsified.

The determination of matrix-like arranged light conductors eliminates such transverse force influences. EP 0 328 703 A1 discloses such an arrangement wherein local pressures can be determined with an accuracy depending on the rastor resolution. In a matrix including a plurality of light conductors, the cross-section of the light conductors changes with radial pressure application so that the light transmission through the light conductors in the matrix changes with the radial pressures to which the light conductors are subjected, as it occurs in the fiber optic sensor according to DE 32 36 435 C2. The principle is based on the reduction of light transmission in a light transmitting passage by constriction under the influence of the pressure forces.

Such an arrangement however has the disadvantage that the elements of the matrix can be read only successively by addressing the various matrix elements (light conductor intersections).

It is the object of the present invention to provide an opto-electronic sensor or rather a tactile part for such a sensor with an unambiguous correlation between the axial pressure effect on the light input side of a body including light passages and the light intensity at the light exit side of the body and with which the pressure effective on the light input side can be simultaneously determined by measuring the light transmission intensities at the outlet side of the body.

SUMMARY OF THE INVENTION

In a tactile opto-electronic pressure sensor having a body with a rigid matrix including axially extending bores in which hollow cylinders of an elastic material are firmly disposed such that the front ends of the hollow cylinder project from one side of the matrix while the opposite ends of the hollow cylinders are flush with the other side of the matrix, a light emitting electro-luminescent foil is disposed on the front faces of the hollow cylinders such that light emitted therefrom shines through the hollow cylinders and is recorded by an evaluation device arranged at the other side of the matrix, the hollow cylinders being axially compressed by forces such that their openings become smaller with increasing forces acting thereon, the light intensity received by the evaluation units depending on the forces applied to the hollow cylinders.

Under axial pressure application to the hollow cylinders, their cross-sections are changed depending on the pressure applied thereto and the intensity of the light transmitted through the hollow cylinders is changed accordingly. An opto-electronic evaluation unit associated with the cylinders records the various pressure-dependent light intensities.

The electro-luminescent foil may cover the whole surface of the first front side of the hollow cylinder or the light source may be structured in a net-like fashion for radiating light into the lumina of the body. A light source is only necessary where the elastic hollow cylinders are located. Net-like light sources whose knots are disposed on the axes of the hollow cylinders are sufficient. The foil or net-like structure may be cemented to the front side of the hollow cylinders to prevent displacement. Such a procedure, however, may not be suitable because of the changing cross-sections of the lumina.

It is important, however, that the matrix material is mechanically stable beyond the maximum pressure that may be applied. In addition, particularly for medical applications, the matrix material must be compatible with the tissue and chemically resistant for touch and it must also be possible to be sterilized.

For the protection from ambient influences, the light entrance side of the tactile part with the electroluminescent foil disposed thereon is provided with a soft, highly elastic, opaque skin which shields the arrangement also from external light. At the same time, it provides for electrical insulation.

Since with this tactile part, each hollow cylinder, that is, each pressure element (or individual sensing element), is fully uncoupled from the others in the matrix as far as elasticity and transverse force influences are concerned, the pressure dependent constriction of the cross-sections of the lumina is solely the result of the axial pressure effective on a particular hollow cylinder. The pressure input is therefore accurately represented by the individual light intensity measurement values depending on the location for a surface area or certain points on the surface.

Below, the invention will be described on the basis of a particular embodiment with reference to the accompanying drawings.

DESCRIPTION OF A PREFERRED EMBODIMENT

Figure 1A:
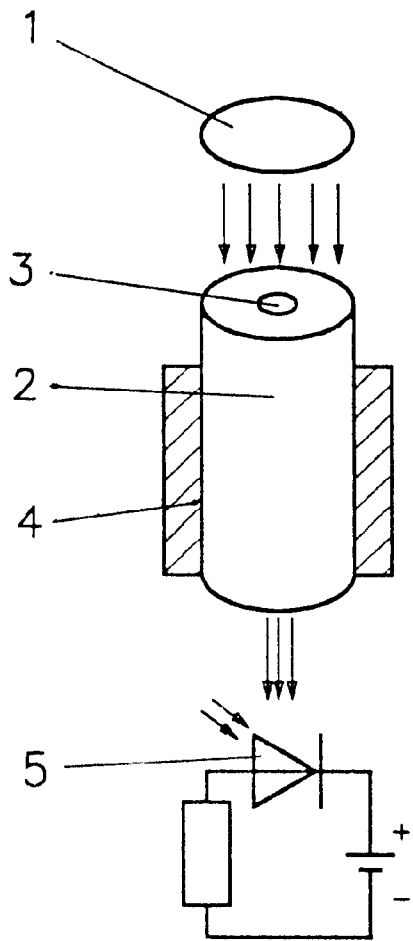
FIG. 1A shows an individual sensor with an evaluation unit.
Figure 1B:
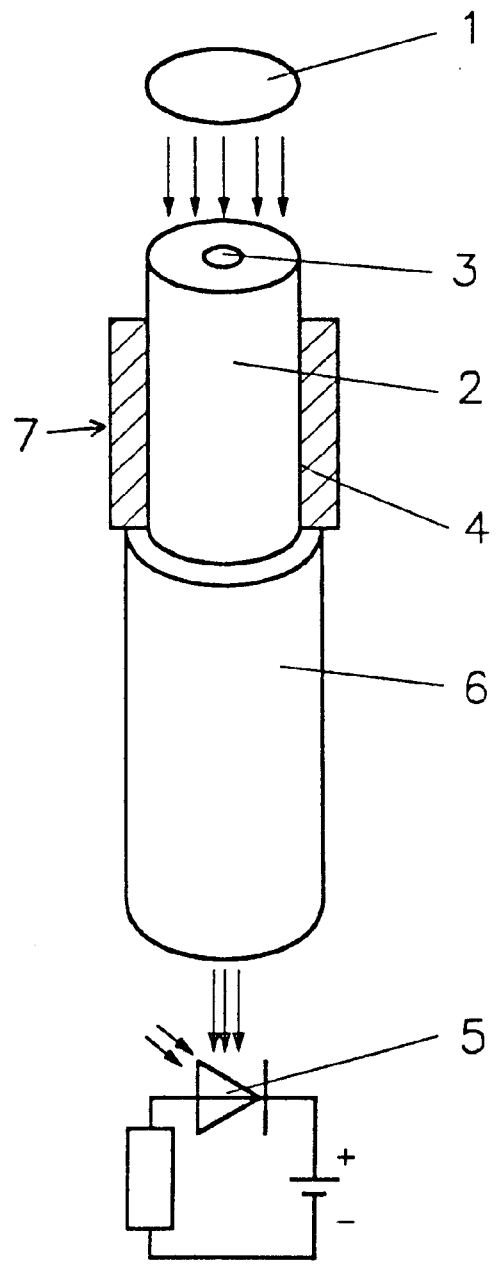
FIG. 1B shows an individual sensor with an evaluation unit and with a flexible light guide.

FIGS. 1A and 1B show schematically an individual sensor as it is used in the tactile part of the electro-optical pressure sensor structures. A section of an electro-luminescent foil 1 disposed on top of the hollow cylinder 2 of elastic material emits light which reaches the lumen 3. In the given example the hollow cylinder 2 consists of silicone rubber. Other elastic materials however may be employed as long as they are suitable for the environment in which the sensor is to be used. The hollow rubber cylinder 2 is firmly mounted in a bore 4 of the matrix 7. The matrix 7 consists of brass. The hollow cylinder 2 projects from the upper surface of the matrix at least so far that, at a certain axial pressure, the lumen 3 closes completely when the end of the lumen is essentially in alignment with the matrix surface. The pressure at which the lumen is completely closed is the highest pressure that can be measured anyway.

At the light exit end, the lumen end face is in alignment with the bottom surface of the matrix. The light transmitted through the lumen reaches the opto-electronic evaluation unit 5 disposed below the matrix 2. A flexible light conductor 6 (FIG. 1B) may be disposed between the matrix 2 and the evaluation unit 5 for conducting the light to the evaluation unit 5.

The evaluation unit 5 is shown schematically by a series circuit arrangement comprising a photodetector with a resistor and a voltage source. The light conductor 6 can be a light fiber bundle or a single fiber depending on the relative size of the sensor 1, 2, 3, 4. However, it is important that, with a matrix arrangement, a position assignment can be arranged. In this case, the light conductors 6 must extend from the individual sensors in a coordinated manner from the tactile part to the opto-electronic converter matrix which consists of an arrangement of opto-electronic evaluation units corresponding to the arrangement of individual sensors in the sensor matrix. CCD chips are particularly suitable herefor.

Figure 2:
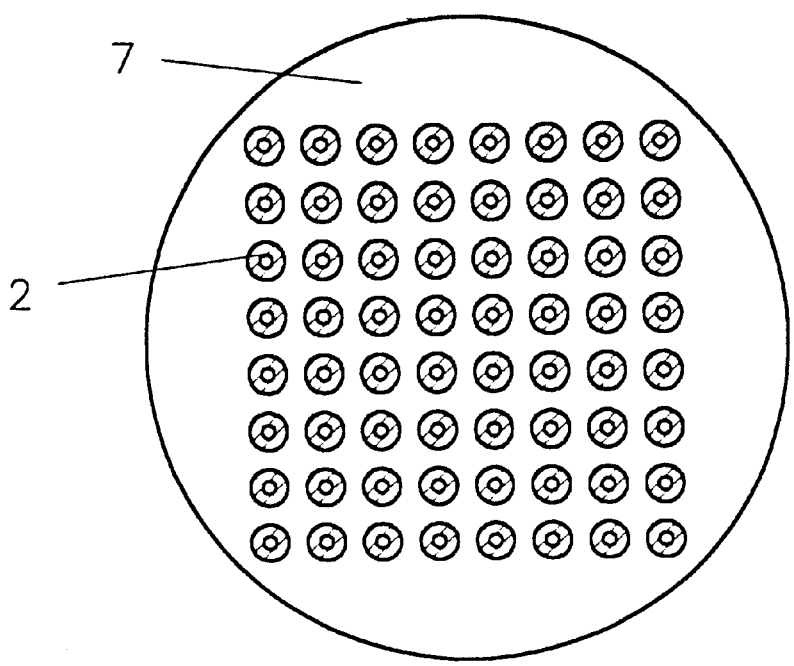
FIG. 2 shows an arrangement of individual sensors combined in an array.

The receiver, that is the matrix 7 as shown in FIG. 2, consists of brass; it includes a square array of individual sensors. Other arrays are possible if the arrangement is to be used for a particular application.

Figure 3:
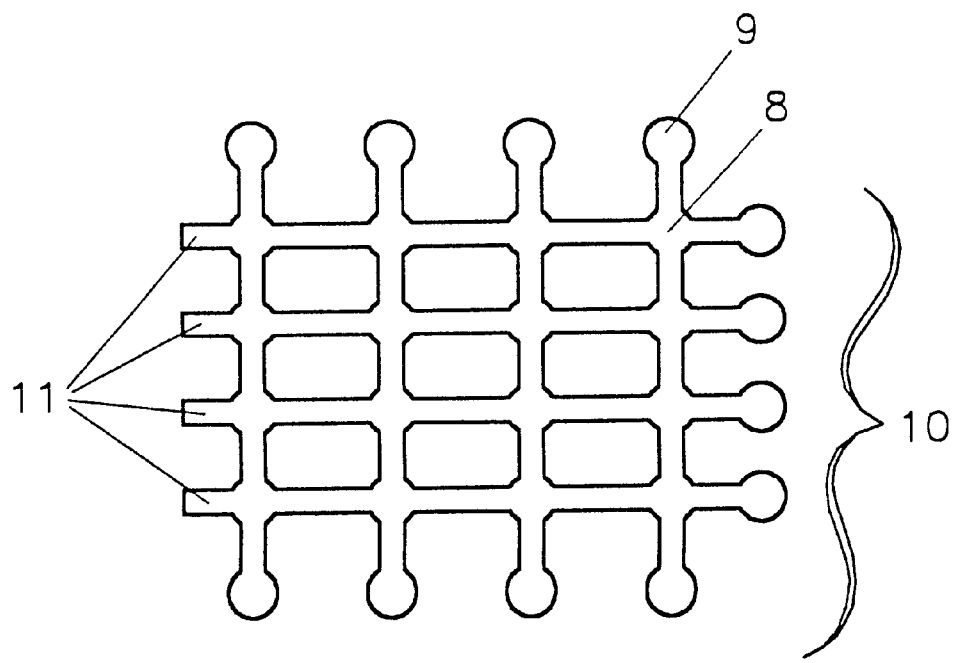
FIG. 3 shows an electro-luminescent foil in the form of a net structure.

At the light input side, the array may be completely covered by the luminescent foil 1. But the luminescent foil 1 may also be structured as it is indicated in FIG. 3. In this case, a knot 8 is disposed at the front end on top of each lumen 3. The individual sensors at the circumference are covered by the extensions 9 of the net-like structure 10. The electrical connection of the foil, or respectively, the net structure 11 is arranged at one side of the foil or the net structure. At this side, the extensions 9 are interconnected for that purpose. It is noted that such a net structure 11 is more elastic than a contiguous foil.

The arrangement of the tactile sensor part according to FIG. 2 is considered for use in the medical field specifically for the probing of tissue. The electro-luminescent foil 1 is 0.17 mm thick. The lumina 3 in the matrix 7 have an outer diameter of 0.8 mm when not compressed and a clear opening of 0.35 mm. The diameter of the matrix is 14 mm; the array includes 8×8 individual sensors as shown in FIG. 2.

What is claimed is:

1. A tactile opto-electronic pressure sensor comprising: a body including a rigid matrix with several axially extending bores, a hollow cylinder of an elastic material fitted into each bore, each of said hollow cylinders having a first front end face projecting from said matrix at one end thereof and a second opposite end face which is flush with said matrix at the opposite side thereof, a light emitting electro-luminescent foil disposed on the first front end faces of said hollow cylinders of elastic material whereby pressures applied to said light emitting electro-luminescent foil are transmitted to said hollow cylinders and said hollow cylinders are axially compressed whereby the clear opening of said hollow cylinders is reduced, said hollow cylinders having inner wall surfaces which do not reflect light or reflect light only in a diffuse fashion, said light emitting electro-luminescent foil generating light which is directed into said hollow cylinders, and an opto-electronic evaluation unit disposed at the opposite, second end face of said matrix so as to receive the light transmitted through said hollow cylinders the intensity of which depends on the pressure applied to said first end faces of said hollow cylinders.

2. A tactile opto-electronic pressure sensor according to claim 1, wherein said electro-luminescent foil disposed on said first end faces of said hollow cylinders is a contiguous foil.

3. A tactile opto-electronic pressure sensor according to claim 1, wherein said electro-luminescent foil disposed on said front end faces is a net-like structure of foil.

4. A tactile opto-electronic pressure sensor according to claim 2, wherein said matrix consist of a tissue-compatible, chemically resistant dielectric material.

5. A tactile opto-electronic pressure sensor according to claim 4, wherein said chemically resistant dielectric material is a metallic material.

6. A tactile opto-electronic pressure sensor according to claim 1, wherein said tactile part is covered by a smooth, highly elastic, opaque dielectric cover of a tissue compatible chemically resistant material.

* * * * *